US012812033B2

(12) United States Patent
Jaffer et al.

(10) Patent No.: US 12,812,033 B2
(45) Date of Patent: Nov. 24, 2026

(54) INTELLIGENTLY DELIVERING A TELEPHONE CALL WITH IDENTITY ATTRIBUTES

(71) Applicant: Numeracle, Inc., Arlington, VA (US)

(72) Inventors: Mohamed Sickanther Anis Jaffer, Orlando, FL (US); Brett Spencer Nemeroff, Austin, TX (US); Keith Charles Buell, Falls Church, VA (US); Pierce Gorman, Lee's Summit, MO (US); Rebekah Ann Johnson, Falls Church, VA (US)

(73) Assignee: Numeracle, Inc., Arlington, VA (US)

( * ) Notice: Subject to any disclaimer, the term of this patent is extended or adjusted under 35 U.S.C. 154(b) by 146 days.

(21) Appl. No.: 18/776,414

(22) Filed: Jul. 18, 2024

(65) Prior Publication Data

US 2026/0025459 A1 Jan. 22, 2026

(51) Int. Cl.
*H04M 3/22* (2006.01)

(52) U.S. Cl.
CPC ................................ *H04M 3/2281* (2013.01)

(58) Field of Classification Search
CPC ............. H04M 3/436; H04M 3/42059; H04M 3/42042; H04M 15/00; H04M 7/006; H04M 3/2218; H04M 3/42102; H04M 3/42068; H04M 3/2281; H04M 1/57; H04M 15/41; H04M 3/54; H04M 2242/22

See application file for complete search history.

(56) References Cited

U.S. PATENT DOCUMENTS

| | | | | |
|---|---|---|---|---|
| 10,979,557 | B2 * | 4/2021 | Johnson | H04L 9/3239 |
| 10,992,800 | B2 * | 4/2021 | Ravichandran | H04M 3/42042 |
| 2011/0103265 | A1 * | 5/2011 | Dilipkumar Saklikar | H04L 63/0815 370/352 |
| 2017/0195481 | A1 * | 7/2017 | Wiegand | H04M 3/42042 |
| 2018/0103150 | A1 | 4/2018 | Chavez et al. | |
| 2020/0304632 | A1 * | 9/2020 | Johnson | H04L 9/3239 |

(Continued)

OTHER PUBLICATIONS

International Search Report and Written Opinion for PCT/US2025/036923 mailed Sep. 26, 2025.

*Primary Examiner* — Akelaw Teshale
(74) *Attorney, Agent, or Firm* — Kilpatrick Townsend & Stockton LLP

(57) ABSTRACT

Telephone calls can be intelligently delivered with identity attributes as described herein. In one example, a system can receives communication associated with a caller requesting to make a telephone call to a recipient, where the communication includes a recipient identifier associated with the recipient. The system can determine a terminating telecommunication service provider (TTSP) to which the telephone number is assigned. The system can then determine identification options available at the TTSP, where each identification option can be configured to provide one or more identity attributes associated with the caller to the recipient. The system can select one or more of the identification options based on a predefined policy and modify the communication to include the one or more identity attributes associated with the one or more selected identification options, thereby producing a modified communication. The system can then transmit the modified communication along a call route to the TTSP.

20 Claims, 6 Drawing Sheets

100

(56) References Cited

U.S. PATENT DOCUMENTS

| | | | | |
|---|---|---|---|---|
| 2021/0281424 | A1* | 9/2021 | Barakat .................. | H04L 63/08 |
| 2025/0356040 | A1* | 11/2025 | Morgan .................. | G06F 40/40 |

* cited by examiner

INTELLIGENTLY DELIVERING A TELEPHONE CALL WITH IDENTITY ATTRIBUTES

TECHNICAL FIELD

The present disclosure relates generally to delivering telephone calls. More specifically, but not by way of limitation, this disclosure relates to intelligently delivering a telephone call with identity attributes.

BACKGROUND

Transmission of telephone calls over the voice telecommunications network has long been used as a mechanism for enterprises to connect and have meaningful engagement with people. More recently, automated telephone calls ("robocalls") have been used by entities to reach large numbers of people about particular information, such as campaign advertisements or commercial solicitations. Unfortunately, due to the ease of use and low financial cost of this mechanism, it has been utilized by bad actors who wish to scam or otherwise deceive people into engaging with them. This has resulted in the number of malicious robocalls skyrocketing, with billions of malicious robocalls being made each month.

Telecommunication service providers and regulators have attempted to curb the amount of malicious robocalls by more effectively presenting telephone calls to their customers through delivering the telephone call with extra metadata including the name of the enterprise, the reason for the telephone call, and a logo of the calling enterprise. However, these attempts have had little success in large part due to how a telephone call propagates through a maze of carriers as well as a lack of uniformity across the industry (e.g., a single provider not employing efforts to curb robocalls provides a pathway for bad actors). Enterprises (e.g., entities placing telephone calls) have also appreciated the problem, but they are either not aware of how telecommunication service providers operate, or they do not have the technical capabilities to properly inject extra metadata into their telephone calls for their customers. Regardless, even if enterprises did have the technical capabilities to properly label their telephone calls, telecommunication service providers would have no reason to trust that data. These problems lead to challenges in pinpointing the origin of telephone calls thereby enabling malicious callers to evade identification.

SUMMARY

One example of the present disclosure includes a system with one or more processors. The system also includes one or more memories including instructions executable by the one or more processors. The instructions can cause the one or more processors to receive a communication associated with a caller requesting to make a telephone call to a recipient. The communication can include a recipient identifier associated with the recipient. The instructions can also cause the one or more processors to determine a terminating telecommunication service provider (TTSP) to which the recipient identifier is assigned. The instructions can also cause the one or more processors to determine identification options available at the TTSP, where each identification option can be configured to provide one or more identity attributes associated with the caller to the recipient. The instructions can also cause the one or more processors to select one or more identification options from the available identification options based on a predefined policy. The instructions can also cause the one or more processors to modify the communication to include the one or more identity attributes associated with the one or more selected identification options, thereby producing a modified communication. The instructions can also cause the one or more processors to transmit the modified communication along a call route to the TTSP.

In some examples, the instructions are further executable by the one or more processors to cause the one or more processors to, prior to routing the telephone call to the TTSP, send a message to the TTSP indicating an intent to invoke the one or more selected identification options for the telephone call, to thereby allow the TTSP to prepare to transmit the telephone call to the recipient with the one or more identity attributes associated with the selected identification option. Additionally or alternatively, the instructions can cause the one or more processors to determine the TTSP to which the recipient identifier is assigned based on a predefined mapping. Additionally or alternatively, the instructions can cause the one or more processors to determine the plurality of identification options available at the TTSP based on a predefined mapping that correlates identification options to telecommunication service providers.

In some examples, the instructions are further executable by the one or more processors to cause the one or more processors to receive device data associated with a user device of the recipient. The device data can include information about a capability of the user device to receive the one or more identity attributes. The instructions can further cause the one or more processors to modify the communication based on the device data.

In some examples, the call route can extend from an originating telecommunication service provider (OTSP) to the TTSP and include multiple intermediate telecommunication service providers in between. Additionally, the instructions can be further executable by the one or more processors to cause the one or more processors to determine one or more intermediate telecommunication service providers along the call route; determine whether each intermediate telecommunication service provider of the one or more intermediate telecommunication service providers supports transmission of the communication including identity attributes (e.g., a modified communication); for each intermediate telecommunication service provider of the one or more intermediate telecommunication service providers that does not support transmission of the modified communication, modify the call route to exchange the intermediate telecommunication service provider with a different intermediate telecommunication service provider that supports transmission of the modified communication, to thereby generate a modified call route; and transmit the modified communication along the modified call route.

Another example of the present disclosure includes a method implemented by one or more processors. The method can include receiving, by one or more processors, a communication associated with a caller requesting to make a telephone call to a recipient, where the communication includes a recipient identifier associated with the recipient. The method also includes determining, by the one or more processors, a terminating telecommunication service provider (TTSP) to which the recipient identifier is assigned. The method can also include determining, by the one or more processors, a plurality of identification options available at the TTSP, each identification option being configured to provide one or more identity attributes associated with the caller to the recipient. The method can also include selecting, by the one or more processors, one or more identification options from the plurality of identification options based on a predefined policy. The method can also include modifying, by the one or more processors, the communication to include the one or more identity attributes associated with the one or more selected identification options, thereby producing a modified communication. The method can also include transmitting, by the one or more processors, the modified communication along a call route to the TTSP.

Yet another example of the present disclosure includes a non-transitory computer-readable medium comprising program code that is executable by one or more processors to cause the one or more processors: receive a communication associated with a caller requesting to make a telephone call to a recipient, where the communication includes a recipient identifier associated with the recipient; determine a terminating telecommunication service provider (TTSP) to which the recipient identifier is assigned; determine a plurality of identification options available at the TTSP, each identification option being configured to provide one or more identity attributes associated with the caller to the recipient; select one or more identification options from the plurality of identification options based on a predefined policy; modify the communication to include the one or more identity attributes associated with the one or more selected identification options, thereby producing a modified communication; and transmit the modified communication along a call route to the TTSP.

Various other examples are described herein, including methods, systems, non-transitory computer-readable storage media storing programs, code, or instructions executable by one or more processors and the like. These illustrative examples are mentioned not to limit or define the scope of this disclosure, but rather to provide examples to aid understanding thereof. Illustrative examples are discussed in the Detailed Description, which provides further description. Advantages provided by various examples may be further understood by examining this specification.

DETAILED DESCRIPTION

Figure 1:
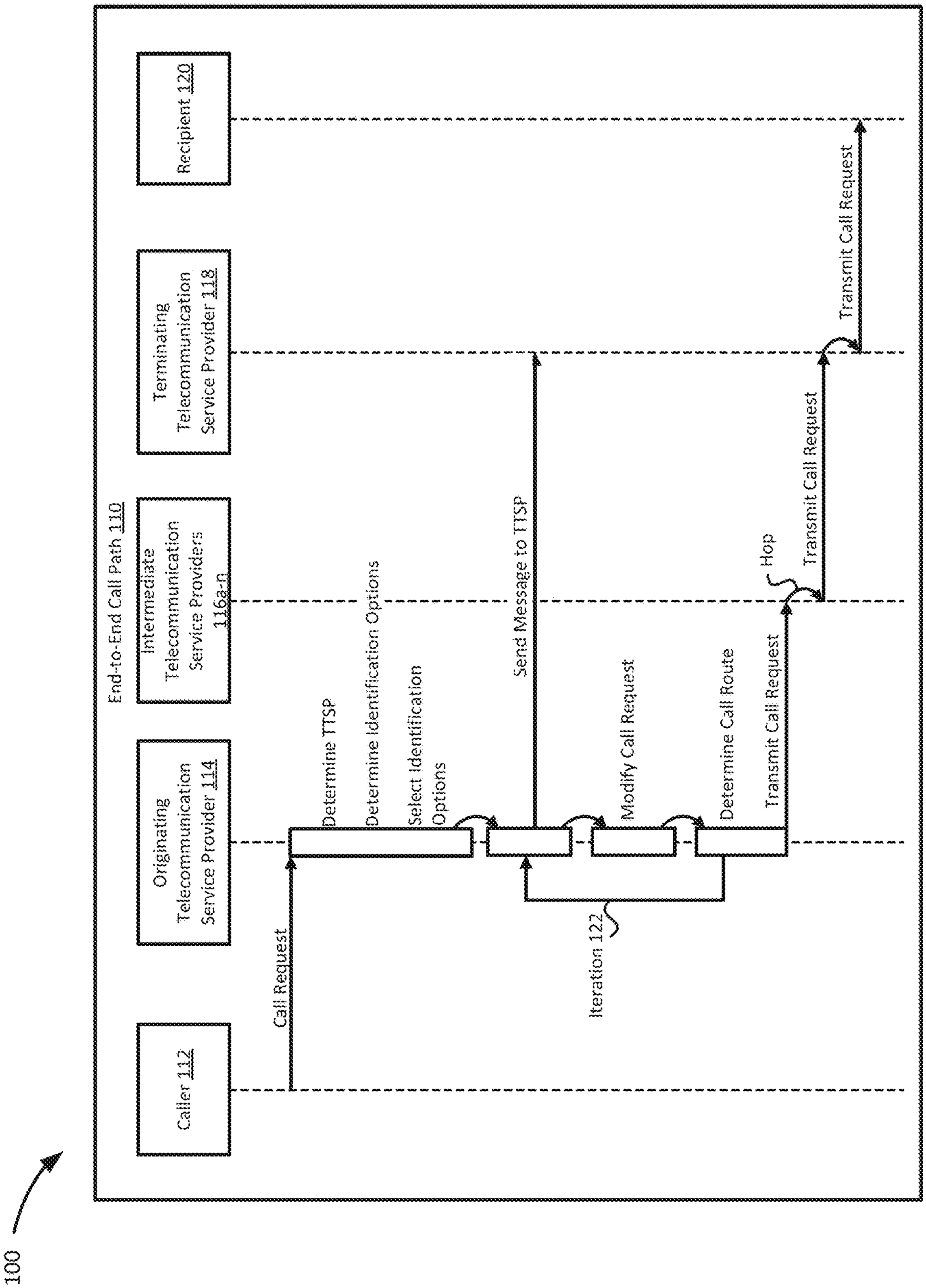
FIG. 1 is a sequence diagram of an example of a process for intelligently delivering a telephone call with identity attributes according to some aspects.

Reference will now be made in detail to various and alternative illustrative examples and to the accompanying drawings. Each example is provided by way of explanation and not as a limitation. It will be apparent to those skilled in the art that modifications and variations may be made. For instance, features illustrated or described as part of one example may be used in another example to yield a still further example. Thus, it is intended that this disclosure includes modifications and variations as come within the scope of the appended claims and their equivalents.

As used herein, the terms "a," "an," and "the" can refer to one or more unless specifically noted otherwise. And the term "or" is not to be construed as identifying mutually exclusive options. For example, the phrase "X contains A or B" can mean that X contains A and not B, X contains B and not A, or X contains both A and B. That is, the term "or" is used to mean "and/or" unless explicitly indicated to refer to alternatives only or the alternatives are mutually exclusive.

Illustrative Example of Intelligently Delivering a Telephone Call with Identity Attributes One illustrative example according to the present disclosure includes a system that is configured to receive a communication (e.g., a call request) from a caller who seeks to make a telephone call from a telephone number to a recipient. The system can be fully integrated into the infrastructure of a telecommunication service provider to which the telephone number of the caller is assigned or fully integrated into the infrastructure of an enterprise. The telecommunication service provider to which the telephone number of the caller is assigned can be referred to as an originating telecommunication service provider (OTSP). Alternatively, the system can be a pluggable system that can be communicatively coupled to the OTSP (e.g., by a wired or wireless connection) and configured to perform the techniques discussed herein. The communication received by the system includes a variety of information about the telephone call that the system can use to intelligently deliver the telephone call. For example, the communication includes the recipient's telephone number and an indication that the caller would like to transmit a telephone call including identity attributes. Identity attributes comprise metadata about the caller that describes various aspects of the caller or the intent of the telephone call. Non-limiting examples of identity attributes include a name of the caller, a reason for the telephone call, a logo associated with the caller, an intent of the call, and the like. The inclusion of identity attributes in the telephone call provides the recipient of the telephone call with additional information about the caller to verify their identity and reason for calling, for example.

Continuing with the illustrative example, the system detects the call request from the caller requesting to make the telephone call to the recipient. In response to this detection, the system determines a terminating telecommunication service provider (TTSP) to which the telephone number of the recipient is assigned. Determining the TTSP involves querying a database (e.g., an industry database such as the Number Portability Administration Center Local Number Portability database) to determine whether the telephone number of the recipient has been ported (e.g., ported from one telecommunication service provider to another telecommunication service provider) through number porting. Querying the database can return a routing identifier. Determining the TTSP further includes querying a predefined mapping that correlates routing identifiers with various telecommunication service providers.

Telecommunication service providers, are assigned telephone numbers associated with their customers, but customers may change telecommunication service providers while keeping their assigned telephone number through number porting. As such, the system first determines whether the telephone number has been ported, and then accesses the predefined mapping to determine which telecommunication service provider is currently associated with the recipient's telephone number. Additionally, it will be appreciated that different telecommunication service providers support different options for transmitting telephone calls with identity attributes. As such, determining which TTSP is associated with the recipient can help ensure that the telephone call is transmitted properly (e.g., including the selected identity attributes).

After the system determines the TTSP, the system determines which identification option or options are supported by the TTSP. Some TTSPs may support one identification option, other TTSPs may support multiple identification options, and still other TTSPs may not support any identification options. Each identification option can enable one or more identity attributes associated with the caller to be transmitted in the telephone call. Different identification options may allow different types or amounts of identity attributes to be transmitted to the recipient.

Based on the supported options, the system will select a particular identification option from among the supported identification options. In some examples, this selection may be done based on a predefined policy (e.g., the cheapest identification option or the most effective identification option). Once the identification option is selected, the system modifies the communication received from the caller to include the identity attributes allowed by the selected identification option. For example, the system determines which identity attributes are allowed by the selected identification option, determine values for those identity attributes based on the caller, and inject the values into the communication. The OTSP then transmits the telephone call along a call route to the TTSP where it can then be processed for transmission to the recipient.

Numerous benefits are achieved by way of the present disclosure over conventional techniques. For example, the techniques described herein provide systems and methods that enable an OTSP to communicate with a TTSP on the front end of a telephone call to determine how to deliver the telephone call with the identity attributes. These techniques benefit callers who may not have the technical means to interoperate with telecommunication service providers, may not be able to determine what identification options are available at the TTSP, or may not have access to industry databases. These techniques also place more trust in the end-to-end call process as identity attributes are included in telephone calls thereby giving telecommunication service providers and recipients more information to verify the identity of the caller. This helps with curbing robocalls as telecommunication service providers and recipients of telephone calls can be provided with more information about the caller and the origins of the telephone call.

The description of the illustrative example above is provided merely as an example, not to limit or define the limits of the present subject matter. Various other examples are described herein and variations of such examples would be understood by one of skill in the art. Advantages provided by various examples may be further understood by examining this specification and/or by practicing one or more examples of the claimed subject matter.

Illustrative Systems and Methods for Intelligently Delivering a Telephone Call with Identity Attributes Turning now to the figures, FIG. 1 is a sequence diagram of an example of a process 100 for intelligently delivering a telephone call with identity attributes according to some aspects. As shown in FIG. 1, the process 100 begins with a caller 112 transmitting a call request to an originating telecommunication service provider (OTSP) 114. The term "caller" may refer to a calling entity and/or their user equipment, such as their mobile phone or other telephonic device, used to initiate a telephone call. An originating service provider can be a telecommunication service provider responsible with controlling the transmission of a telephone calls. The communication generated by the caller 112 is a request by the caller 112 to place a telephone call using a caller telephone number to a recipient telephone number assigned to Recipient 120. The term "recipient" may refer to the receiving entity and/or their user equipment, such as their mobile phone or other telephonic device, used to receive the telephone call. The call request may include a Session Initiation Protocol (SIP) INVITE having a SIP header, into which the caller 112 can insert the caller telephone number, among other information. SIP is a text-based protocol for initiating, maintaining, and terminating an exchange of data between participants operating internet protocol devices. The SIP INVITE is an invitation to a participant (e.g., recipient 120) to communicate with the sender of the SIP INVITE (e.g., the caller 112). In some examples, the SIP INVITE header can further include rich call data (RCD). RCD may be structured as a JavaScript Object Notation object that can be inserted into the SIP INVITE header and can contain additional information about the call such as caller name, caller number, caller logo, and/or a reason for caller.

As described above in relation to the illustrative example, the techniques described by the present disclosure may be performed by entities that are separate from the OTSP but work in conjunction with the OTSP to accomplish the goals described herein. Additionally, or alternatively, these techniques may be performed directly by the OTSP. For the sake of simplicity, the operations and steps described below are described as being performed by the OTSP, although one of ordinary skill will recognize that variations are possible.

The OTSP 114 can detect the call request from the caller 112. In addition to detecting the call request, the OTSP 114 can detect additional information that is included in the communication as a part of the call request. For example, the OTSP 114 can determine that the caller 112 would like to transmit a telephone call to a telephone number associated with the recipient 120 and that the caller 112 would like to include identity attributes as a part of the telephone call. This determination can be done through accessing the information contained in the SIP INVITE.

Responsive to this determination, the OTSP 114 can determine a terminating telecommunication service provider (TTSP) 118 to which the recipient's 120 telephone number is assigned. Like the OTSP 114, the TTSP 118 can be a telecommunication service provider responsible with calling the recipient. Determining the TTSP to which the recipient's 120 telephone number is assigned involves accessing a database (e.g., Number Portability Administration Center Local Number Portability database) to determine whether the telephone number of the recipient 120 has been ported between telecommunication service providers through number porting. Accessing the database can return a routing identifier associated with the recipient 120. The OTSP can then access a predefined mapping using the routing identifier that correlates routing identifiers with various telecommunication service providers to determine which TTSP the telephone number of the recipient 120 is currently assigned to. One example of a routing identifier could be a local routing number stored by the database and associated with the recipient's 120 telephone number.

In some examples, after the OTSP 114 has determined the TTSP 118 to which the recipient's 120 telephone number is assigned, a real time query of the TTSP 118 may be performed to confirm that the recipient's phone number is actually assigned to the TTSP 118. In particular, the OTSP 114 can transmit a query requesting an assignment confirmation to the TTSP 118, which can respond in the affirmative or negative if the recipient's telephone number is currently assigned the TTSP 118. Because telephone users can port their telephone number between different telecommunication service providers (e.g., so that they can keep their telephone number when changing providers), the real time query can help confirm the assignment of the recipient's telephone number to a particular TTSP 118 and thereby enable accurate information for use by the OTSP 114.

After determining the TTSP 118 associated with the telephone phone number belonging to the recipient 120, the OTSP 114 can determine identification options available at TTSP 118. The identification options available at the TTSP 118 can be the identification options supported by the infrastructure utilized by the TTSP 118. In some examples, the determination of identification options can be done through a predefined lookup table that has been published or otherwise made available by the TTSP 118 for access by other telecommunication service providers. In other examples, the predefined lookup table can be compiled by one or more third-party entities, and the predefined lookup table can contain information about identification options available at multiple TTSPs. In other examples, the determination of the identification options can be done through a real-time query of the TTSP 118 by the OTSP 114. In other examples, the determination can be performed through a combination of a predefined lookup table and a real-time query. Additionally, the identification options can be configured such that one or more identity attributes associated with the caller 112 can be included in the call request for analysis and viewing by the TTSP 118 and/or the recipient 120. The identity attributes can include metadata about the caller 112 describing various aspects about the caller 112 or the call request (e.g., an intent of the telephone call). Non-limiting examples of identity attributes can include a name of the caller; a reason for the telephone call; in the case where the caller is an enterprise, a logo associated with the enterprise; an intent of the call; and the like.

Additionally, determining the identification options available at the TTSP 118 can also include a determination of the types of transmission methods supported by the TTSP 118. Not every TTSP will support transmission of the same types of identity attributes, and in some examples, a TTSP may not support transmission of any identity attributes. For example, some TTSPs may support transmission of SIP/RCD telephone calls while other TTSPs may only support transmission of telephone calls with identity attributes through a pre-call API. As such, allowing the OTSP 114 to identify the TTSP 118, determine which identification options that are available at the TTSP 118, and determining what transmission methods are available at the TTSP 118 can provide the caller 112 with confidence in the delivery of their call request to the recipient 120.

Continuing with FIG. 1, once the OTSP 114 has determined the identification options available at the TTSP 118, the OTSP 114 can select from the available identification options based on a predefined policy associated with the OTSP 114 and/or the caller 112. In some examples, the selected identification options can be based on monetary cost, where the selected option is the cheapest option, or a subscription level the caller 112 has with the OTSP 114. In other examples, the policy can be based on effectiveness. In other words, the selected identification option can be the one that is most likely to be received by the recipient. One example mechanism of determining how likely a telephone call will be received and answered by the recipient uses Answer Seizure Ratio (ASR) which is a ratio of successfully connected calls to call attempts. Another example mechanism of determining how likely a telephone call will be received and answered by the recipient uses Average Call Duration (ACD) which is the average length of all answered calls that pass through (e.g., are transmitted by) the OTSP. In some examples, the policy can take into account multiple different factors/mechanisms to determine which identification option to select and some factors may be prioritized over others. For instance, the policy may prioritize effectiveness over cost, but where two options are equally effective, the policy may fall back to cost as the deciding factor. It will be appreciated that any number and combination of factors and prioritizations can be employed by the policy to select an identification option from among multiple choices. Different callers and/or OTSPs may have different policies, which they may customize to satisfy their particular criteria for call delivery.

After an identification option is selected, one or more steps may be performed (once or iteratively) by the OTSP 114. While FIG. 1 illustrates a series of steps, not all the steps are required for each call request. Additionally, the steps may be performed in any order as determined by the OTSP 114. Moreover, as illustrated by iteration 122, the steps may be performed iteratively (represented by arrow 122) for as many iterations as needed to ensure that the call request has the highest likelihood of properly being delivered to the recipient 120 with all the intended identity attributes selected by the caller 112 and the OTSP 114.

The first step that may be performed by the OTSP 114 is to send a message to the TTSP 118. Alternatively, the OTSP 114 can send the message to another entity associated with the TTSP 118. That entity can then signal the TTSP 118 in response to receiving the message. The message can be an indication sent to the TTSP 118 of an intent to invoke the selected identification option for the telephone call. In other words, the OTSP 114 preemptively provides information that allows the TTSP 118 to prepare to transmit the telephone call to the recipient with the one or more identity attributes associated with the selected identification option. In some examples, the message itself can include both an intent to invoke the selected identification options and the identity attributes. In some examples, this message can be implemented as a pre-call application programming interface (API). By sending a message in advance of the telephone call, the likelihood that the telephone call will be properly transmitted with the intended identity attributes is increased because the TTSP 118 will be made aware that a telephone call of this nature is on the way and can prepare accordingly. In some examples, a TTSP (or another entity working on behalf of the TTSP) can utilized a message notification system operable to detect and analyze these messages. This reduces the chances that the telephone call is not otherwise altered or blocked by the TTSP 118.

The second step that may be performed by the OTSP 114 is to modify the call request. This step can involve the OTSP 114 modifying the communication associated with the call request to include the one or more identity attributes associated with the selected identification option, thereby producing a modified communication. For instance, the OTSP 114 can determine that the selected identification option allows for a particular set of identity attributes, determine values for those identity attributes based on the caller, and incorporate those values into the communication. To determine the values for the identity attributes based on the caller, the OTSP 114 can extract information contained in the SIP header such as a name of the caller, location of the call, reason for calling, etc. Additionally or alternatively, the OTSP 114 may determine the values through accessing a predefined profile of identity attributes stored at the OTSP 114. (Delete comment after revie)

Modifying the communication to include the one or more identity attributes associated with the selected identification option can involve modifying the SIP header associated with the telephone call, adding or deleting content contained in the SIP header, or changing the content in the telephone call based on information received during the step of determining the TTSP 118 and/or the preferences indicated by a pre-defined dataset made available by TTSP 118. As one example, the TTSP 118 may support a certain type of identification options in call transmissions to recipients. Additionally, the TTSP 118 may employ a policy that results in blocking telephone calls that contain identity attributes that are not supported by their service offerings. As such, by allowing the OTSP 114 to obtain this information and modify the communication as appropriate, it can increase the likelihood that the call request will be properly transmitted rather than blocked.

The third step that may be performed by the OTSP 114 is to determine a call route for the call request. As a telephone call traverses through the voice telecommunications network from a caller to a recipient, the telephone call may "hop" to numerous different telecommunication service providers along a call route as it is transmitted to its end destination. As illustrated by FIG. 1, the end-to-end call path can include any number of intermediate telecommunication service providers 116*a-n*. With respect to the call route of a telephone call, these intermediate telecommunication service providers 116*a-n* can be conceptually positioned between the OTSP 114 and the TTSP 118, such that the call request is transmitted starting at the OTSP 114, hops to one or more intermediate telecommunication service providers, and is received by the TTSP 118, where it can then be transmitted to the recipient 120. Similar to the TTSP 118 as described above, each intermediate telecommunication service provider 116*a-n* may support certain identification options and can be any one of the example telecommunication service providers previously mentioned. As a result, in this third step, the OTSP 114 can determine the optimal call route for the call request.

To determine the optimal call route, the OTSP 114 can first determine one or more next-hop intermediate telecommunication service providers 116*a-n* along the call route, where the call route extends from the OTSP 114 to the TTSP 118, as mentioned above. A next-hop intermediate telecommunication service provider refer to the next telecommunication system to which the OTSP 114 transmits the communication along the call route. The OTSP 114 can then determine whether any of the next-hop intermediate telecommunication service providers 116*a-n* support transmission of the communication including the one or more identity attributes associated with the selected identification option. In the case where a next-hop intermediate telecommunication service provider 116*a-n* does not support transmission of the communication (e.g., because it does not support the selected identification option), the OTSP 114 can modify the call route to exchange the next-hop intermediate telecommunication service provider with a different next-hop intermediate telecommunication service provider that supports transmission of the communication. This process can generate a modified call route, which has been optimized to improve the likelihood of successful delivery of the communication to the TTSP 118. Without this optimization, the telephone call could be blocked or modified along the call route by an intermediate telecommunication service provider that does not support the selected identification option resulting in a loss of effectiveness of transmission of identity attributes.

After the OTSP 114 has performed some or all of the steps described above, either once or multiple times in iteration, the OTSP 114 can transmit the call request along the modified call route. The telephone call will ultimately be received by the TTSP 118 and then transmitted to the recipient 120. Recipient 120 can receive the telephone call with the included identity attributes describing the caller 112. Such attributes may be displayed on the user equipment of the recipient 120, which can help the recipient 120 make a more informed decision about whether to accept or reject the telephone call. As mentioned above, these techniques can help curb robocalls as telecommunication service providers and recipients of telephone calls can be provided with more information about the caller and the origins of the telephone call.

In some examples, the included identity attributes may enable a feedback loop to allow telecommunication service providers to identify callers and provide instructions to callers for ways to improve their calling practices to be more inline with industry accepted standards. In one example, the included identity attributes can enable a telecommunication service provider to determine the identity of the caller, who may be a business process outsourcing organization that places marketing telephone calls on behalf of a business. Additionally, the telecommunication service provider can make a determination that the caller is placing telephone calls outside of normal business hours. Based on these determinations, the telecommunication service provider can provide instructions to the caller that the caller should modify the timing of their telephone calls to be more inline with industry standards (e.g., during normal business hours) or else their calls will be blocked. This feedback loop improves ubiquity across the industry as telecommunication service providers are more aware (e.g., due to the included identity attributes) of the identity of callers and recipients and can provide feedback and instructions to assist callers in improving their practices.

While reference to a recipient telephone number is described above in relation to FIG. 1, other forms of recipient identifiers may be used to identity a TTSP associated with a recipient 120. Non-limiting examples of recipient identifiers can include an Internet Protocol (IP) address, a Media Access Control (MAC) address, an email address, and the like. As one example, the caller 112 can insert the recipient's 120 IP address into the communication. The OTSP can then query a database that contains a pre-defined mapping of IP addresses associated with a recipient device to various TTSPs. The OTSP can query this database to determine a which TTSP the IP address associated with the recipient's device is assigned. As another example, the caller 112 can insert the recipient's 120 MAC address into the communication. The OTSP can then query a database that contains a pre-defined mapping of MAC addresses associated with a recipient device to various TTSPs. The OTSP can query this database to determine which TTSP the MAC address associated with the recipient's device is assigned. As still another example, the caller 112 can insert an email address of the recipient 120 into the communication. The OTSP 114 can then query a database that contains a predefined mapping of email addresses to recipient telephone numbers. Using the database, the OTSP 114 can determine a telephone number to which the email address is associated with and then perform the steps described above (e.g., determine a routing identifier associated with the telephone number and then determine a TTSP associated with the routing identifier) to determine a TTSP to which the email address is assigned.

Additionally, the communication described in relation to FIG. 1 is associated with a caller requesting to make a telephone call to a recipient. In some examples, the telephone call could be a voice telephone call or a video telephone call. Additionally, other mechanisms of communication (e.g., in addition to telephone calls) are possible. For example, the communication could be associated with a sender requesting to send a text-message with identity attributes to a recipient. In this case, the text-message could include a recipient identifier and the steps discussed herein could determine a TTSP associated with the recipient identifier for purposes of sending a text message with identity attributes. The text-message could also be in the form of an audio message, for example. One of ordinary skill will appreciate many suitable variations.

Figure 2:
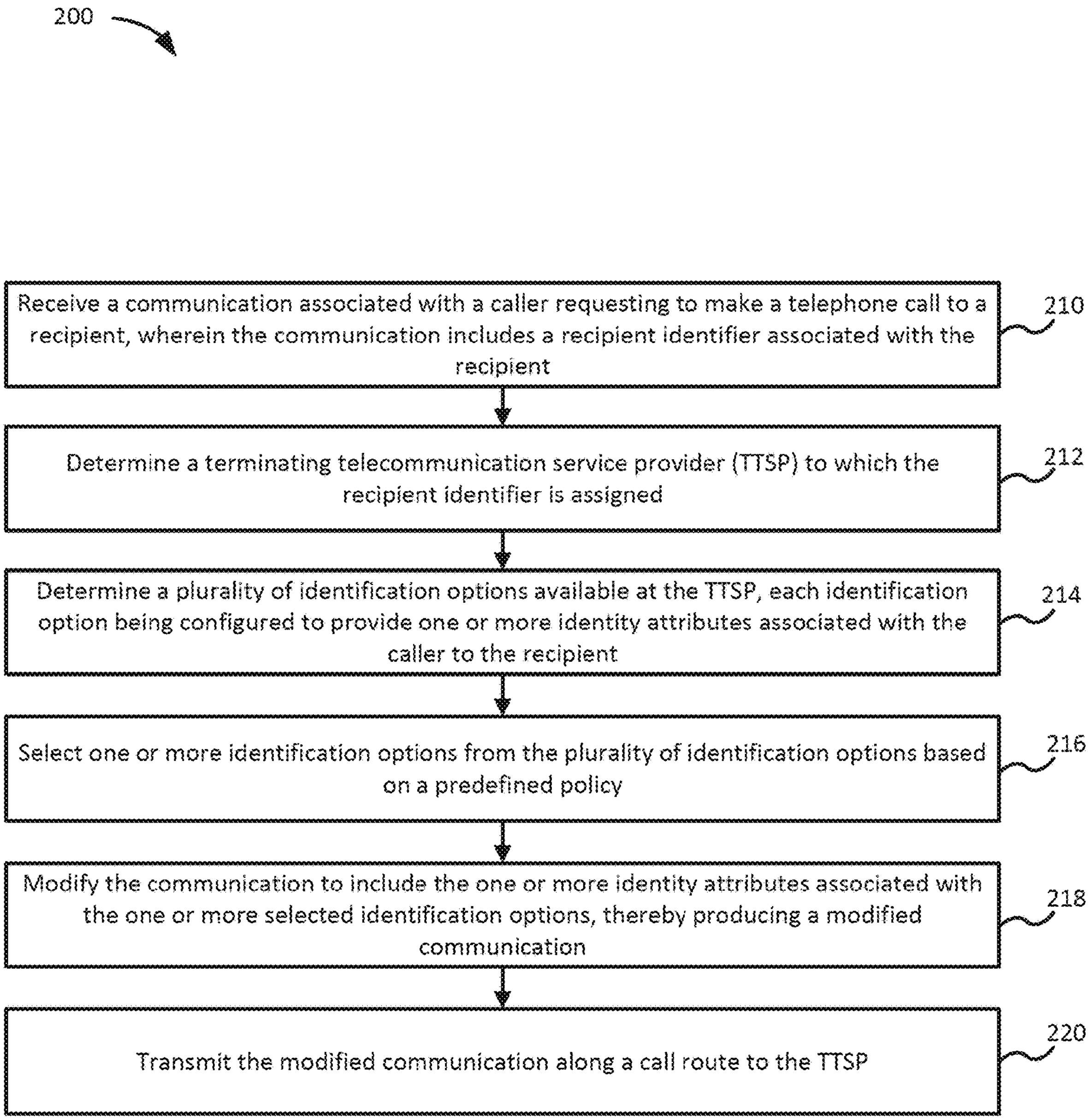
FIG. 2 is a flowchart of an example of a process for intelligently delivering a telephone call with identity attributes according to some aspects.

FIG. 2 is a flowchart of an example of a process 200 for intelligently delivering a telephone call with identity attributes according to some aspects. The steps illustrated by process 200 may be performed, for example, by one or more processors of a computing device operating as a separate system or integrated as a part of an OTSP, such as OTSP 114 described above in relation to FIG. 1. For the sake of simplicity, the steps illustrated in process 200 and described below, are described in relation to being performed a processor, although variations and other configurations are possible.

As illustrated, process 200 may begin at block 210 in which a processor can receive a communication associated with a caller requesting to make a telephone call to a recipient. The communication can be associated with a request from a caller (e.g., an individual caller or an enterprise) requesting to communicate with a recipient and can include a recipient identifier associated with the recipient. The communication may include a SIP INVITE having a SIP header, into which the caller can insert the caller telephone number, among other information. Among the other information included in the communication may include an indication from the caller that they wish to transmit a telephone call to the recipient that includes identity attributes.

At block 212, the processor can determine a TTSP to which the recipient identifier is assigned. As mentioned previously, the TTSP can be a telecommunication service provider responsible with controlling the transmission of telephone calls. To determine the TTSP to which the recipient identifier is associated, In some examples, the processor can determine the TTSP to which the recipient identifier is associated based on one or more predefined mappings. In one example where the recipient identifier is a telephone number, the one or more predefined mappings can include one or more industry databases such as the Number Portability Administration Center database that indicates which telephone numbers correspond to which telecommunication service providers. In some examples, after initially identifying the TTSP, the processor may communicate (e.g., in real time) with the TTSP to confirm that the recipient telephone number is currently assigned to that TTSP. For example, the processor can transmit a query to an API of the TTSP requesting confirmation that the recipient telephone number is currently assigned to that TTSP.

At block 214, the processor can determine one or more identification options available at the TTSP. At this block of process 200, each determined identification option available at the TTSP can be configured to provide one or more identity attributes associated with the caller to the recipient as a part of the telephone call (e.g., included in the communication). The identification options available at the TTSP can be the identification options supported by the infrastructure utilized by the TTSP or identification options that the TTSP provides as a benefit of using their services, for example. In some examples, the identification options available at the TTSP can be compared, by the processor, with the infrastructure utilized by the OTSP to make a determination about whether the OTSP can support the identification options. Each of the identification options may be configured to provide a different set of identity attributes to the recipient. The identity attributes can include metadata about the caller describing various aspects about the caller or the call request (e.g., a name of the caller, an intent of the telephone call, a reason for calling, a logo, etc.).

To determine the identification options supported by the TTSP, the processor can utilize a data source that maps the identification options to the determined TTSP. For example, the processor can access a database that maps each TTSP to its corresponding one or more identification options. Using the database, the processor can determine which particular identification option or options, if any, are supported by the TTSP along with methods of transmission for those identification options. Not every TTSP will support transmission of the same types of identity attributes, and in some examples, a TTSP may not support transmission of any identity attributes. Thus, this process can allow the processor to determine which identification options are actually supported by the TTSP, which can increase the likelihood that the telephone call will be transmitted properly to the recipient.

At block 216, the processor can select one or more identification options from the plurality of identification options based on a predefined policy. The predefined policy can be associated with the OTSP and/or the caller of the telephone call. The predefined policy can use one or more factors as the basis for selecting one or more identification options from among the plurality of identification options. In some examples, the selected identification options can be chosen based on cost, where the selected option is the cheapest option. In other examples, predefined policy can be configured to select a particular identification option based on its effectiveness, where effectiveness is a measure of how likely the telephone call including the selected identification option will be successfully received by the recipient.

At block 218, the processor can modify the communication to include the one or more identity attributes of the caller that are associated with the selected identification options, thereby producing a modified communication. Modifying the communication can involve modifying the one or more SIP headers associated with the telephone call, adding or deleting content contained in the one or more SIP headers, or changing the content in the telephone call based on identity attributes and the preferences indicated from the determined TTSP. Incorporating the caller's identity attributes into the communication can allow for those identity attributes to be delivered to the recipient.

In some examples, a TTSP may support certain types of identification options in telephone calls they transmit. Additionally, the TTSP may employ a policy that results in blocking telephone calls that contain identity attributes that are not supported by the TTSP or that are improperly formatted. To prevent the call from being blocked, the OTSP can modify the communication as appropriate (e.g., reformat it, remove unsupported identity attributes, and/or include the supported identity attributes) to increase the likelihood that the call request will be properly transmitted.

At block 220, the processor can transmit the modified communication along a call route to the TTSP. Through the end-to-end process of a telephone call, there will likely be multiple intermediate telecommunication service providers that receive the call request. These intermediate telecommunication service providers can be conceptually positioned between the OTSP and the TTSP, where the call request begins at the OTSP and ends at the TTSP and hops to different intermediate telecommunication service providers along the call route. Thus, at block 220, the process 200 proceeds to transmit the modified communication along the call route to the TTSP. The TTSP then receives the modified communication, including the identity attributes, and can transmit the call to the intended recipient (e.g., their telephone device).

Figure 3:
FIG. 3 is a flowchart of an example of a process for intelligently delivering a telephone call with identity attributes based on device data according to some aspects.

Turning now to FIG. 3, FIG. 3 is a flowchart of an example of a process 300 for intelligently delivering a telephone call with identity attributes based on device data according to some aspects. Process 300 includes many of the steps described above in relation to process 200. The similar steps in process 300 therefore may share description as the corresponding step described above in relation to process 200, and as a result, the description references prior discussion of similar functionality.

Blocks 310-316 of process 300 are generally performed as discussed above with respect to block 210-216 of FIG. 2. At block 318 the processor can receive device data associated with a user device (e.g., user equipment such as a mobile or stationary telephone) of the recipient. Examples of the device data can include the operating system, firmware, hardware, geographical location, and other software such as mobile applications of the user device. The processor may receive the device data through a real-time query or through accessing a database that stores device data associated with telephone numbers. In some examples, the device data can include information about a capability of the user device to receive the one or more identity attributes. This can include information such as an indication that the user device is a smartphone with capabilities to display identity attributes on the screen of the user device for display to a user. For example, the device data can provide an indication that the user device has a touchscreen display of a certain dimension and resolution. The device data can also provide an indication as to capabilities of the user device to handle identity information (e.g., a telephone request including identity attributes).

The processor can communicate with the TTSP and/or an application provider (such as WhatsApp, iMessage, etc.) whose application is deployed on the device to obtain the device data associated with the user device. For example, the device data can be acquired and stored by the TTSP or an application provider to which the recipient identifier assigned. To acquire the device data, the TTSP and/or the application provider can communicate with the user device. The device data may be periodically acquired and stored by the TTSP and/or application provider. In some examples, the TTSP and/or application provider may acquire the device data in real time from the user device in response to a request from the processor. The device data then can be transmitted to the processor and used by the processor for intelligently transmitting telephone calls with identity information. Additionally, based on the device data and the particular application installed on the user device, the processor could push identity attributes directly to the application provider. In these examples, the application could provide additional functionality for relaying the identity attributes to the recipient such as playing an audio track that audibly recites the identity attributes (e.g., plays the name of the caller, for example).

At block 320, the processor can modify the communication to include at least some of the identity attributes associated with the selected identification options. The communication may additionally or alternatively be modified based on the device data. The result of such modification(s) is a modified communication.

In some examples, the device data can influence which identification options are selected. For example, in the case where a caller wishes to include an identity attribute associated with their enterprise logo in the communication, but the device data indicates that the user device does not support display of the enterprise logo (e.g., because the user device does not have a display screen), then at block 320, the processor may not select the enterprise logo identity attribute in the communication. Additional examples of device data that can influence which identification options are selected may include data indicating support for a particular file type, image size, color depth, crop shape, and the like. In this way, the processor may determine the one or more identity attributes associated with the selected identification options, select a subset of the one or more identity attributes based on the device data, and only include that limited subset of identity attributes in the communication (thereby producing the modified communication). This may help ensure that the user device only receives identity attributes that it supports, which can prevent errors and other problems.

At block 322, the processor can transmit the modified communication along a call route to the TTSP. Transmitting the modified communication can include transmitting the communication from the OTSP to the next telecommunication service provider in the chain, allowing for the telephone call to ultimately be propagated to the TTSP. Thus, at block 322, the process 300 proceeds to transmit the modified communication along the call route to the TTSP. The TTSP then receives the modified communication, including the appropriate identity attributes based on the device data, and transmits the call with the identity attributes to the recipient.

Figure 4:
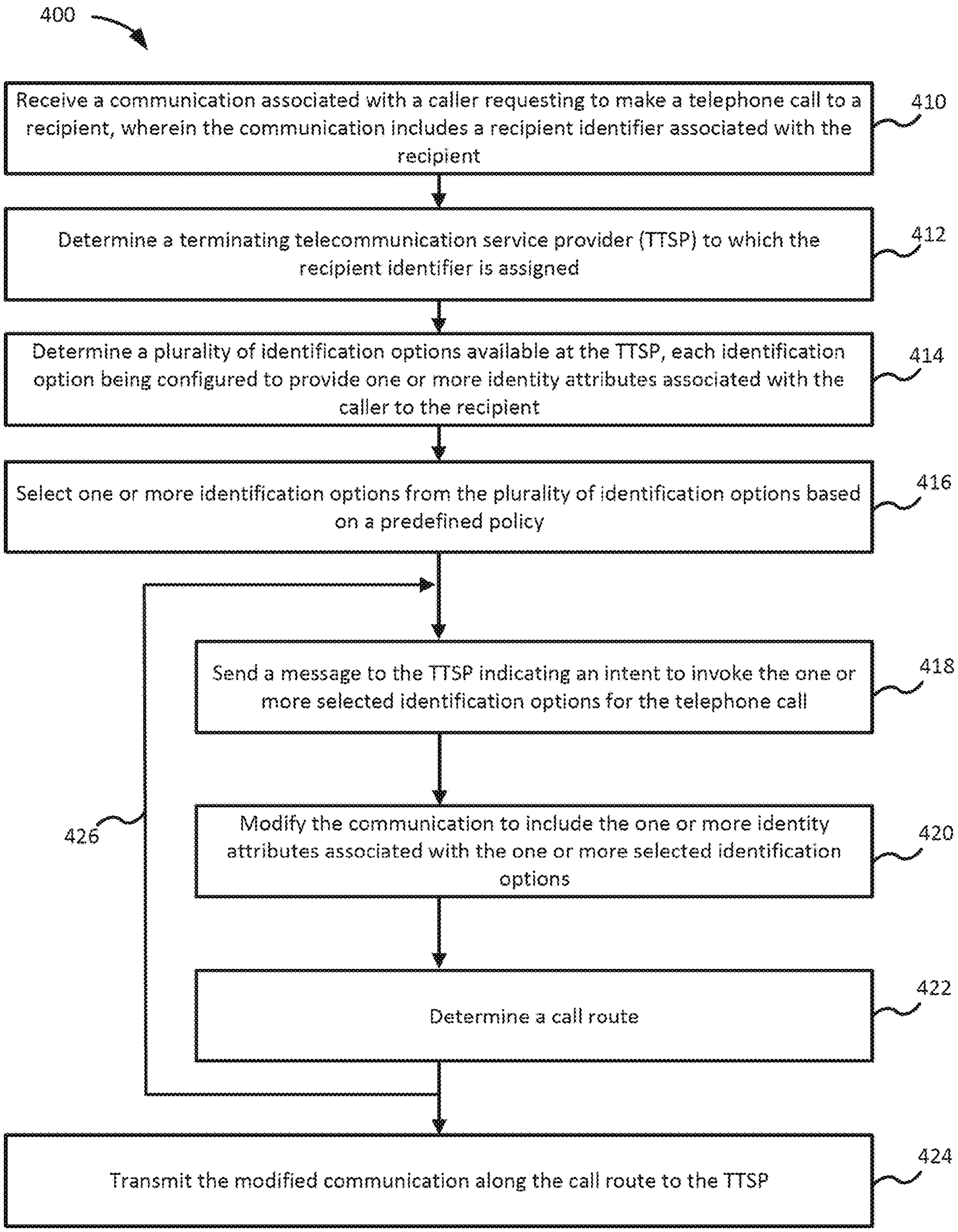
FIG. 4 is a flowchart of an example of a process for intelligently delivering a telephone call with identity attributes according to some aspects.

Turning now to FIG. 4, FIG. 4 is a flowchart of an example of a process 400 for intelligently delivering a telephone call with identity attributes according to some aspects. Similar to process 300, process 400 includes many of the same steps described above in relation to process 200. The similar steps in process 400 therefore may share the same description as the corresponding step described above in relation to process 200, and as a result, the description references prior discussion of similar functionality.

Blocks 410-416 of process 400 are generally performed as discussed above with respect to block 210-216 of FIG. 2. At block 418, the processor can send a message to the TTSP or another entity, which is associated with the TTSP, indicating an intent to invoke the selected identification option for the telephone call. In some examples, the message can also include the selected identification options. The message can include an identifier of (e.g., a unique code for) the selected identification options and can be sent to the TTSP or other entity via an API of the TTSP. The processor can provide this advance notification to the TTSP to allow the TTSP to prepare to transmit the telephone call to the recipient with the one or more identity attributes associated with the selected identification option. In some examples, this message can be implemented as an API call. By sending the message to the TTSP or other entity associated with the TTSP (which can then signal the TTSP), the likelihood that the telephone call will be properly transmitted with the intended identity attributes is increased because the TTSP is made aware that a telephone call of this nature is on the way. Sending the message also reduces the chances that the telephone call is altered or otherwise blocked by the TTSP upon receipt.

The message itself can also include the selected identity attributes. In some examples, the call route may not support transmission of identity attributes. That is, a caller may want to send a telephone call with identity attributes and a TTSP may support telephone calls with identity attributes, but intermediate telecommunication service providers on the call route may not support transmission of such calls. In these cases, the identity attributes can be included in the API call to the TTSP. As a result, the message will provide the TTSP with the selected the identity attributes and the message will make the TTSP aware that a telephone call of this nature is on the way. The TTSP can then receive the communication and insert the identity attributes into the communication it as it is transmitted to the recipient.

At block 420, the processor can modify the communication to include the one or more identity attributes associated with the selected identification options. This step may be implemented similarly to block 320 of FIG. 3.

At block 422, the processor can determine a call route. The process for determining a call route is described in more detail below in relation to process 500 of FIG. 5. However, at this block, the processor can evaluate the modified communication and determine the optimal call route to transmit the telephone call from the OTSP to the TTSP.

Process 400 optionally includes one or more iterations 426 of some or all of blocks 418-422. Thus, blocks 418-422 may be repeated to achieve the benefits according to the present disclosure. For example, after the communication is modified at block 420, process 400 proceeds to block 422 to determine a call route. However, in this determination of the call route, the processor may determine that due to the nature of the modified communication, the call route may include additional or different intermediate telecommunication service providers that require a preemptive message (e.g., a pre-call API request) prior to the call. So, the process 400 will return to block 418, where a message can be sent to the newly determined intermediate telecommunication service provider(s). Then, based on information received from these newly identified intermediate telecommunication service providers, the process 400 may iterate to block 420 and modify the communication as appropriate. This iterative process can repeat as necessary to ensure successful transmission of the telephone call.

At block 424, the processor can transmit the modified communication along the call route to the TTSP. This step can be performed as described above with respect to FIGS. 2-3. The TTSP then receives the modified communication and transmits the call with the identity attributes to the recipient.

Figure 5:
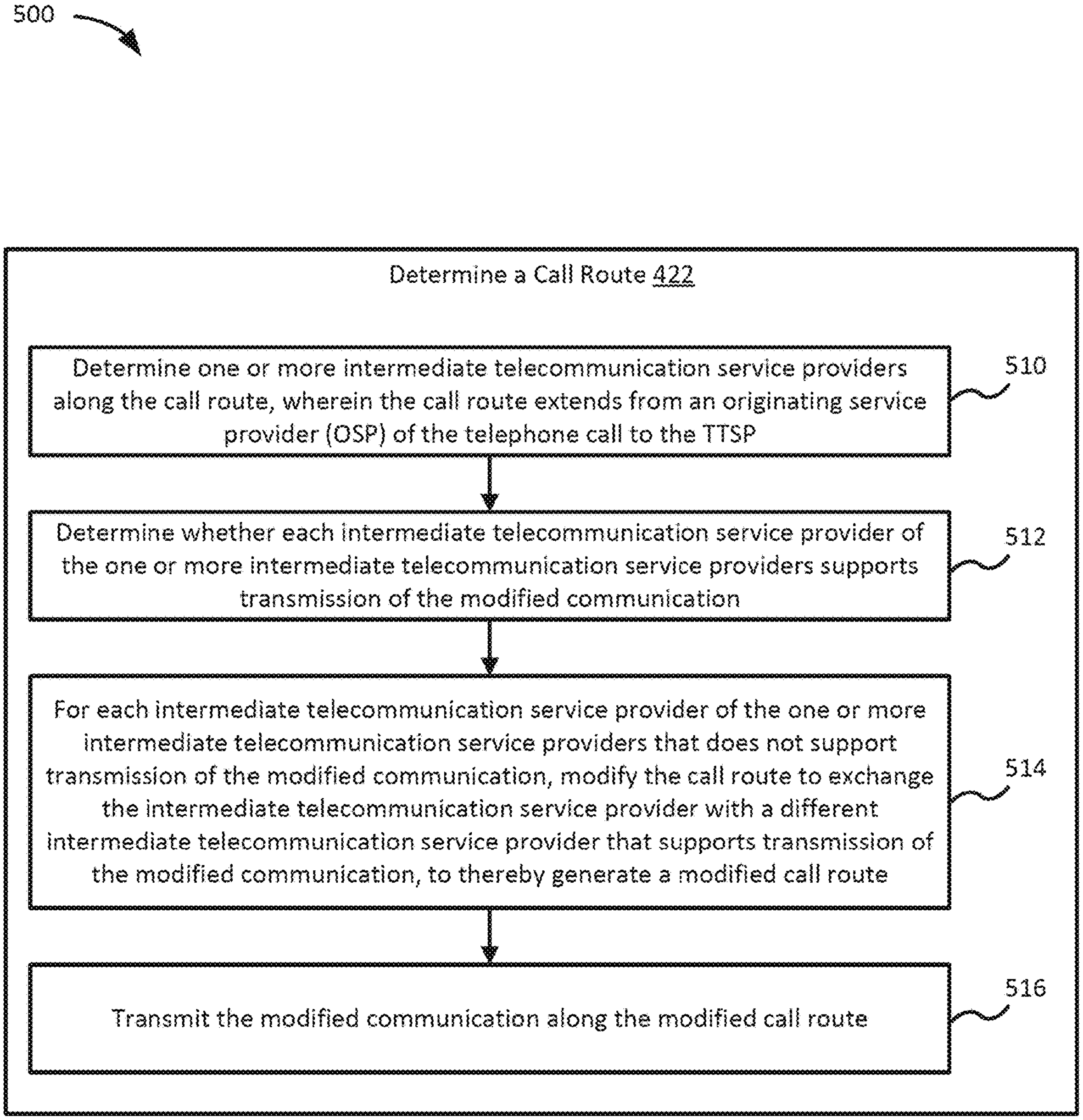
FIG. 5 is a flowchart of an example process for determining a call route for intelligently delivering a telephone call with identity attributes according to some aspects.

FIG. 5 is a flowchart of an example process 500 for determining a call route for intelligently delivering a telephone call with identity attributes according to some aspects. Process 500 includes additional steps associated block 422 described above in relation to process 400 of FIG. 4. As illustrated by process 500, determining a call route may begin at block 510 where a processor can determine one or more intermediate telecommunication service providers along the call route. In some examples, the intermediate telecommunication service providers may include "next-hop" intermediate telecommunication service providers, which refers to the subsequent service provider after the OTSP in the end-to-end process of a telephone call. Additionally, through the end-to-end process of a telephone call, there will likely be at least one intermediate telecommunication service provider that receives the call request. These intermediate telecommunication service providers can be conceptually positioned between the OTSP and the TTSP, where the call request begins at the OTSP and ends at the TTSP and hops to different intermediate telecommunication service providers along the call route.

At block 512, the processor can determine whether each intermediate telecommunication service provider (e.g., a next-hop intermediate telecommunication service provider or another telecommunication service provider farther down the chain) along the call route supports transmission of the modified communication (e.g., a telephone call including identity attributes). As described above with respect to the TTSP, each intermediate telecommunication service provider will have their own infrastructure and abilities to support telephone calls that include identity attributes. So, at block 512, the processor determines the capabilities of each intermediate telecommunication service provider with respect to whether they can support transmission of the modified communication. To do so, the processor may communicate (e.g., via APIs) with each intermediate telecommunication service provider to determine their supported capabilities. Additionally or alternatively, the processor can access a predefined database that correlates each of the telecommunication service providers with their supported capabilities for use in this step.

At block 514, for each intermediate telecommunication service provider that does not support transmission of the modified communication (e.g., because it includes unsupported identity attributes, is in an unsupported format, or it does not support transmission of telephone calls with identity attributes), the processor can modify the call route. This may involve exchanging the intermediate telecommunication service provider with a different intermediate telecommunication service provider that supports transmission of the modified communication. For instance, the next-hop intermediate telecommunication service provider may be exchanged with a different next-hop intermediate telecommunication service provider. In some examples, exchanging the intermediate telecommunication service provider may be performed by the processor based on cost where a particular provider offers a cheaper cost for transmitting telephone calls with identity attributes.

In other examples, exchanging the intermediate telecommunication service provider may be performed by the processor based on effectiveness in transmission of telephone calls with identity attributes. In other words, the processor may perform a determination that a particular provider successfully transmits a certain percentage of telephone calls with identity attributes (e.g., 90% success rate) and the processor may select the provider with the highest rate of success. To determine success rates of telephone calls with identity attributes, the processor may perform a periodic query (e.g., every 10 minutes) of each provider and perform a determination about the success rates for each queried provider to determine a level of effectiveness (e.g., success rate). In this way, the modified call route will be optimized in a sense, in that it is dynamically adjusted to reduce the likelihood of problems in delivering the telephone call with the included identity attributes, and this process may allow the OTSP to more effectively deliver a telephone call with the selected identification options.

At block 516, the processor can transmit the modified communication along the modified call route. The modified communication can then be received by the TTSP. The TTSP can evaluate the modified communication and transmit it to the recipient.

Figure 6:
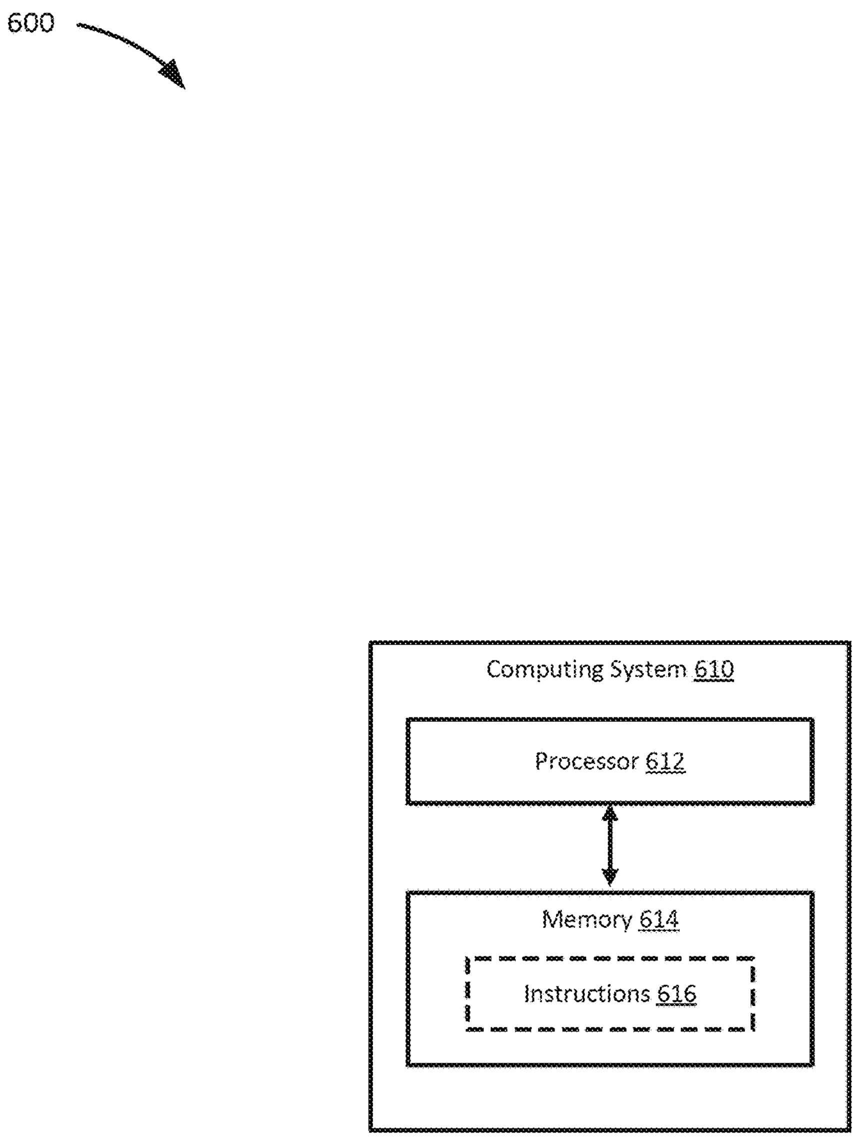
FIG. 6 is a block diagram of an example of a computing system for implementing some aspects.

FIG. 6 is a block diagram of an example of a computing system usable to implement some aspects described herein. The computing system 610 includes a processor 612 communicatively coupled with a memory device 614. The processor 612 can include one processor or multiple processors. Non-limiting examples of the processor 612 include a Field-Programmable Gate Array (FPGA), an application-specific integrated circuit (ASIC), a microprocessor, etc. The processor 612 can execute instructions 616 stored in the memory device 614 to perform operations. In some examples, the instructions 616 can include processor-specific instructions generated by a compiler or an interpreter from code written in any suitable computer-programming language, such as C, C++, C#, etc. For example, the instructions 616 can include the instructions that cause the processor 612 to perform the operations discussed in relation to process 200 of FIG. 2, process 300 of FIG. 3, process 400 of FIG. 4, and/or process 500 of FIG. 5.

The memory device 614 can include one memory device or multiple memory devices. The memory device 614 can be non-volatile and may include any type of memory device that retains stored information when powered off. Non-limiting examples of the memory device 614 include electrically erasable and programmable read-only memory (EEPROM), flash memory, or any other type of non-volatile memory. In some examples, at least some of the memory device can include a non-transitory computer-readable medium from which the processor 612 can read instructions 616. A computer-readable medium can include electronic, optical, magnetic, or other storage devices capable of providing the processor 612 with computer-readable instructions 616 or other program code. Non-limiting examples of a computer-readable medium include magnetic disk(s), memory chip(s), ROM, random-access memory (RAM), an ASIC, a configured processing device, optical storage, or any other medium from which a computer processing device can read the instructions 616.

The forgoing examples are not limited to the precise number and arrangement of telecommunication service providers, computing devices, components, and/or steps described above. Other examples can involve other combinations or arrangement of these elements. For example, iteration 426 discussed in relation to process 400 of FIG. 4 may skip a step (e.g., skip block 420), but continue to iterate through the other steps involved with the iteration. The determination of which steps to execute can be made by the processor and the steps may be iterated as necessary to achieve the benefits of the techniques described herein. Numerous other modifications, adaptations and uses of the techniques described herein will be apparent to those skilled in the art without departing from the scope of the disclosure.

What is claimed is:

1. A system comprising:

one or more processors; and one or more memories including instructions executable by the one or more processors to cause the one or more processors to:

receive a communication associated with a caller requesting to make a telephone call to a recipient, wherein the communication includes a recipient identifier associated with the recipient;

determine a terminating telecommunication service provider (TTSP) to which the recipient identifier is assigned;

determine a plurality of identification options available at the TTSP, wherein each identification option defines a metadata presentation capability supported by the TTSP to present one or more identity attributes associated with the caller to the recipient;

select one or more identification options from the plurality of identification options based on a predefined policy;

modify the communication to include the one or more identity attributes associated with the one or more selected identification options, thereby producing a modified communication; and transmit the modified communication along a call route to the TTSP.

2. The system of claim 1, wherein the instructions are further executable by the one or more processors to cause the one or more processors to determine the TTSP to which the recipient identifier is assigned based on one or more predefined mappings.

3. The system of claim 1, wherein the instructions are further executable by the one or more processors to cause the one or more processors to determine the plurality of identification options available at the TTSP based on a predefined mapping that correlates identification options to telecommunication service providers.

4. The system of claim 1, wherein the communication is a Session Initiation Protocol (SIP) invite, and wherein the one or more identity attributes indicate a name of the caller, a reason for the telephone call, a logo associated with the caller, or an intent of the telephone call.

5. The system of claim 1, wherein the instructions are further executable by the one or more processors to cause the one or more processors to:

prior to routing the telephone call to the TTSP, send a message to the TTSP indicating an intent to invoke the one or more selected identification options for the telephone call, to thereby allow the TTSP to prepare to transmit the telephone call to the recipient with the one or more identity attributes associated with the selected identification option.

6. The system of claim 1, wherein the instructions are further executable by the one or more processors to cause the one or more processors to:

receive device data associated with a user device of the recipient, wherein the device data includes information about a capability of the user device to receive the one or more identity attributes; and modify the communication based on the device data.

7. The system of claim 1, wherein the call route comprises a plurality of intermediate telecommunication service providers, and the instructions are further executable by the one or more processors to cause the one or more processors to:

determine one or more intermediate telecommunication service providers along the call route, wherein the call route extends from an originating telecommunication service provider (OTSP) of the telephone call to the TTSP;

determine whether each intermediate telecommunication service provider of the one or more intermediate telecommunication service providers supports transmission of the modified communication;

for each intermediate telecommunication service provider of the one or more intermediate telecommunication service providers that does not support transmission of the modified communication, modify the call route to exchange the intermediate telecommunication service provider with a different intermediate telecommunication service provider that supports transmission of the modified communication, to thereby generate a modified call route; and transmit the modified communication along the modified call route.

8. A method comprising:

receiving, by one or more processors, a communication associated with a caller requesting to make a telephone call to a recipient, wherein the communication includes a recipient identifier associated with the recipient;

determining, by the one or more processors, a terminating telecommunication service provider (TTSP) to which the recipient identifier is assigned;

determining, by the one or more processors, a plurality of identification options available at the TTSP, wherein each identification option defines a metadata presentation capability supported by the TTSP to present one or more identity attributes associated with the caller to the recipient;

selecting, by the one or more processors, one or more identification options from the plurality of identification options based on a predefined policy;

modifying, by the one or more processors, the communication to include the one or more identity attributes associated with the one or more selected identification options, thereby producing a modified communication; and transmitting, by the one or more processors, the modified communication along a call route to the TTSP.

9. The method of claim 8, further comprising determining the TTSP to which the recipient identifier is assigned based on one or more predefined mappings.

10. The method of claim 8, further comprising determining the plurality of identification options available at the TTSP based on a predefined mapping that correlates identification options to telecommunication service providers.

11. The method of claim 8, wherein the communication is a Session Initiation Protocol (SIP) invite, and wherein the one or more identity attributes indicate a name of the caller, a reason for the telephone call, a logo associated with the caller, or an intent of the telephone call.

12. The method of claim 8, further comprising:

prior to routing the telephone call to the TTSP, sending a message to the TTSP indicating an intent to invoke the one or more selected identification options for the telephone call, to thereby allow the TTSP to prepare to transmit the telephone call to the recipient with the one or more identity attributes associated with the selected identification option.

13. The method of claim 8, further comprising:

receiving device data associated with a user device of the recipient, wherein the device data includes information about a capability of the user device to receive the one or more identity attributes; and modifying the communication based on the device data.

14. The method of claim 8, wherein the call route comprises a plurality of intermediate telecommunication service providers, and the method further comprises:

determining one or more intermediate telecommunication service providers along the call route, wherein the call route extends from an originating telecommunication service provider (OTSP) of the telephone call to the TTSP;

determining whether each intermediate telecommunication service provider of the one or more intermediate telecommunication service providers supports transmission of the modified communication;

for each intermediate telecommunication service provider of the one or more intermediate telecommunication service providers that does not support transmission of the modified communication, modifying the call route to exchange the intermediate telecommunication service provider with a different intermediate telecommunication service provider that supports transmission of the modified communication, to thereby generate a modified call route; and transmitting the modified communication along the modified call route.

15. A non-transitory computer-readable medium comprising program code that is executable by one or more processors to cause the one or more processors to:

receive a communication associated with a caller requesting to make a telephone call to a recipient, wherein the communication includes a recipient identifier associated with the recipient;

determine a terminating telecommunication service provider (TTSP) to which the recipient identifier is assigned;

determine a plurality of identification options available at the TTSP, wherein each identification option defines a metadata presentation capability supported by the TTSP to present one or more identity attributes associated with the caller to the recipient;

select one or more identification options from the plurality of identification options based on a predefined policy;

modify the communication to include the one or more identity attributes associated with the one or more selected identification options, thereby producing a modified communication; and transmit the modified communication along a call route to the TTSP.

16. The non-transitory computer-readable medium of claim 15, further comprising program code that is executable by the one or more processors to cause the one or more processors to determine the TTSP to which the recipient identifier is assigned based on one or more predefined mappings.

17. The non-transitory computer-readable medium of claim 15, further comprising program code that is executable by the one or more processors to cause the one or more processors to:

determine the plurality of identification options available at the TTSP based on a predefined mapping that correlates identification options to telecommunication service providers.

18. The non-transitory computer-readable medium of claim 15, further comprising program code that is executable by the one or more processors to cause the one or more processors to:

prior to routing the telephone call to the TTSP, send a message to the TTSP indicating an intent to invoke the one or more selected identification options for the telephone call.

19. The non-transitory computer-readable medium of claim 15, further comprising program code that is executable by the one or more processors to cause the one or more processors to:

receive device data associated with a user device of the recipient, wherein the device data indicates a capability of the user device to receive the one or more identity attributes; and modify the communication based on the device data.

20. The non-transitory computer-readable medium of claim 15, further comprising program code that is executable by the one or more processors to cause the one or more processors to:

determine one or more intermediate telecommunication service providers along the call route, wherein the call route extends from an originating telecommunication service provider (OTSP) of the telephone call to the TTSP;

determine whether each intermediate telecommunication service provider of the one or more intermediate telecommunication service providers supports transmission of the modified communication;

for each intermediate telecommunication service provider of the one or more intermediate telecommunication service providers that does not support transmission of the modified communication, modify the call route to exchange the intermediate telecommunication service provider with a different intermediate telecommunication service provider that supports transmission of the modified communication, to thereby generate a modified call route; and transmit the modified communication along the modified call route.

* * * * *